Oct. 25, 1966  P. L. HATTON  3,280,572
TUNNELLING METHOD AND APPARATUS
Filed March 12, 1964
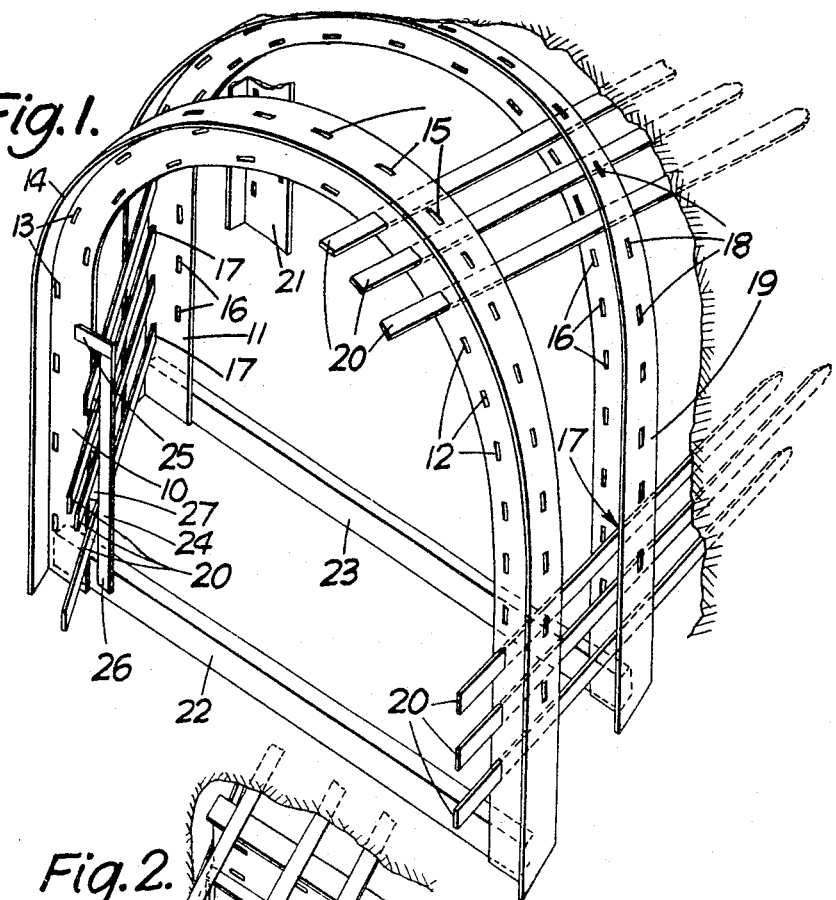
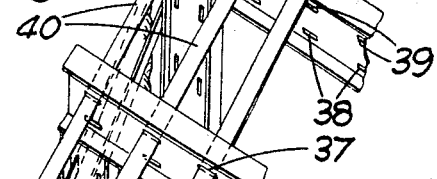
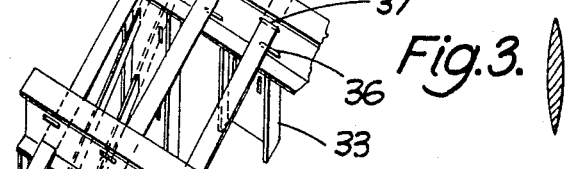
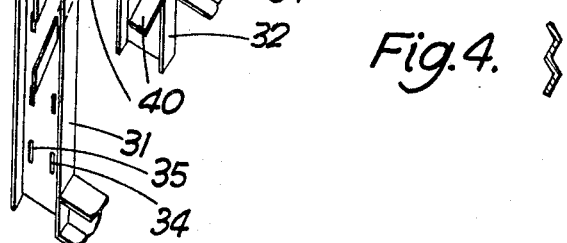

United States Patent Office 3,280,572
Patented Oct. 25, 1966

3,280,572
TUNNELLING METHOD AND APPARATUS
Patricia L. Hatton, "Dunluce" Swanlow Lane,
Winsford, England
Filed Mar. 12, 1964, Ser. No. 351,491
4 Claims. (Cl. 61—85)

The invention relates to a method of and apparatus for driving tunnels. The term "tunnel" is used in its broadest sense and includes other excavations underground such as passages, shafts and trenches.

According to the invention there is provided a method of driving a tunnel which method comprises placing a frame at or adjacent to the face of the ground through which the tunnel is to be driven, which frame defines the approximate cross sectional area of the tunnel (or a part thereof) and is provided with a series of holes, driving elongated members through the holes into the ground ahead of the frame to define the walls of the tunnel, excavating the ground along at least part of the length of the elongated members to form part of the tunnel, placing a second frame provided with a series of holes in the tunnel spaced ahead of the first frame, driving elongated members through the holes into the ground ahead of the second frame to define the walls of a further part of the tunnel, and excavating the ground along at least part of the length of the further elongated members the positioning of the frames, the holes therein, and the elongated members being such that the elongated members and frames support the ground around the walls of the tunnel.

The frame need not enclose the approximate cross sectional area of the tunnel. It should, however, be so constructed that when in position with the elongated members, the frame and the members support the ground around the walls of the tunnel.

In the preferred embodiment of the invention two frames are spaced apart along the tunnel, and each is provided with two parallel rows of holes one being inside the other, and the elongated members are passed through the holes nearer the inside of the first frame and then through the holes nearer the outside of the second frame before being driven into the ground to define the walls of a further length of tunnel.

The frames may have holes through which securing members are driven into the tunnel wall at an angle to the elongated members to secure the frames in place.

The preferred elongated members are slats but it will be appreciated that other elongated members could be used to perform the same functions, for example a number of rods could be used in place of each slat. The spacing and strength of the frames and slats will also depend on the pressure exerted by the ground.

The invention also provides apparatus for use in tunnelling comprising two frames each of a shape and size to define the walls of the tunnel (or a part thereof) and each having two rows of holes the rows conforming in shape to the walls (or part) and one row being within the other in combination with a plurality of slats or prongs which, when the frames are aligned one behind the other and spaced apart, can be driven each through a hole of the inner row of one frame and the outer row of the other frame to project beyond the said other frame, the projecting portions of the slats diverging outwardly.

Following is a description by way of example and with reference to the accompanying drawings of methods and apparatus for carrying the present invention into effect.

In the drawings:

FIGURE 1 is a perspective view showing the positioning of the frames and elongated members in the method according to the invention for the construction of a tunnel, FIGURE 2 is a perspective view showing the positioning of the frames and elongated members at the corner of a rectangular tunnel, and FIGURES 3 and 4 show in cross-section alternative forms of slats for use in the method of the invention.

Referring now to FIGURE 1, hooped frames 10 and 11 are placed in a tunnel which it is desired to extend, the frame 11 being at the face of the ground through which the tunnel is to be extended. Frame 10 has parallel rows of slots 12 and 13 and a laterally extending flange 14 which carries another row of slots 15. Frame 11 is identical with frame 10 having two parallel rows of slots 16 and 17 and another row of slots 18 in its laterally extending flange 19. In extending the tunnel slats 20 are passed through the slots 12 nearer the inside of the frame 10, through the slots 17 nearer the outside of frame 11 and then ahead of frame 11 into the face of the ground to define the walls of the tunnel as shown in the right hand side of FIGURE 1.

The ground is then excavated along part of the length of the slats 20 to form part of the tunnel. Another hooped frame 21, part of which is shown in FIGURE 1 is placed in the tunnel to support the slats 20. This frame is identical with frames 10 and 11. Slats (not shown) are passed through slots 16 in frame 11 and the slots nearer the outside of frame 21 and then into the ground. The tunnel is excavated along part of the length of the slats and then a further identical frame (not shown) is erected in the tunnel to support the slats ahead of the frame 21. Further slats (not shown) are passed first through the holes nearer the inside of frame 21 and then the holes nearer the outside of the next frame and then driven into the ground at the face of the tunnel. More ground is excavated to extend the tunnel. The procedure is repeated until the desired length of tunnel has been constructed.

The frames 10 and 11 are secured in place in the tunnel by stakes driven through the holes 15 and 18 into the tunnel walls. The frames are also fastened together by ties (not shown). Joists 22 and 23 fasten together the bottoms of the frames 10 and 11. The other frames are fixed in place in the tunnel in the same way.

An alternative way of inserting slats is shown in the left hand side of FIGURE 1. Instead of passing the slats through holes in the frame 10, the slats 20 are passed through the space provided between the frame 10 and a temporary upright post 24 which is fastened to the frame 10 at 25 and is also secured at 26 to the joist 22. The slats are shown passing through slots 17 in the frame 11. This method of inserting the slats can be adopted if it is found that additional slats are needed but there are no more holes in the frame 10. Spacers 27 are inserted between the slats 20 on the left hand side of FIGURE 1.

FIGURE 2 shows the construction of a tunnel of rectangular cross section on exactly the same principle as shown in the right hand side of FIGURE 1. The frames 31, 32, 33 are composed of rolled steel joists provided with parallel rows of slots 34, 35; 36, 37; 38, 39 for slats 40. The slats need not be of rectangular cross section as shown in FIGURE 2 but can be of other cross sections as shown in FIGURES 3 and 4. Hollow slats may be used should grouting be required.

In the methods illustrated in the drawings additional supports may be provided at the tunnel face if required. Thus joists may be fixed across the tunnel at a convenient distance from the face and height above the floor so as not to obstruct the working space, the joists being provided with holes through which slats are driven to support the face. The slots may be made in the frames as required during the tunnelling operation. The sides of the tunnel may be concreted as the work progresses.

The method of the invention is intended for use in driving tunnels through moderately unstable ground.

In the method and apparatus illustrated in the drawings the frames are made from rolled steel joists.

I claim:
1. A method of driving a tunnel which method comprises positioning two frames in the tunnel, a first frame spaced from the face of the ground through which the tunnel is to be driven and a second frame at or adjacent the said face, each frame defining the approximate cross-sectional area of the tunnel and being provided with a first and a second row of holes, the holes in both rows extending through the frame in the direction of the tunnel, and the first row being spaced inwardly of the second row, driving elongated members through the first row of holes in the first frame, through the second row of holes in the second frame and into the ground ahead of the second frame to define the walls of the tunnel, excavating the ground along at least part of the length of the elongated members to form part of the tunnel, placing a third frame at or adjacent the thus-formed face of the ground through which the tunnel is to be driven, said third frame being spaced from the second frame and having, as have the first and second frames, first and second rows of holes extending through the frame in the direction of the tunnel, the first row being spaced inwardly of the second row, driving further elongated members through the first row of holes in the second frame, through the second row of holes in the third frame and into the ground ahead of the third frame to define the walls of the tunnel, and excavating the ground along at least part of the length of the further elongated members.

2. A method as claimed in claim 1 wherein the frames have further holes through which securing members are driven into the tunnel wall at an angle to the elongated members to secure the frames in place.

3. A method as claimed in claim 1 wherein the elongated members are slats.

4. A support for a tunnel comprising at least three frames spaced apart along the length of the tunnel, each frame defining the approximate cross-sectional area of the tunnel and being provided with a first and a second row of holes, the holes in both rows extending through the frame in the direction of the tunnel and the first row being spaced inwardly of the second row, and a plurality of elongated members, each member extending in the direction of the tunnel through a hole in the first row of a first frame, through a hole in the second row of a second frame and outside a third frame, the said elongated members defining the walls of the tunnel between the frames.

References Cited by the Examiner

UNITED STATES PATENTS 1,255,207  2/1918  Morgan _____ 61—45

OTHER REFERENCES

German application Das. 1,091,059, 1960.

CHARLES E. O'CONNELL, *Primary Examiner.*

JACOB SHAPIRO, *Examiner.*